United States Patent [19]
Daoud

[11] Patent Number: 6,056,584
[45] Date of Patent: May 2, 2000

[54] DUAL SIDED INSULATION DISPLACEMENT CONNECTOR BLOCK

[75] Inventor: Bassel Hage Daoud, Parisippany, N.J.

[73] Assignee: Lucent Technologies Inc., Murray Hill, N.J.

[21] Appl. No.: 09/045,152

[22] Filed: Mar. 19, 1998

[51] Int. Cl.[7] .................................................. H01R 11/20
[52] U.S. Cl. .......................................... 439/403; 439/417
[58] Field of Search ..................... 439/403, 417

[56] References Cited

U.S. PATENT DOCUMENTS

| | | |
|---|---|---|
| 3,611,264 | 10/1971 | Ellis . |
| 4,533,198 | 8/1985 | Anhalt ..................................... 439/404 |
| 4,662,699 | 5/1987 | Vachhani et al. . |
| 4,913,659 | 4/1990 | Doyle . |
| 5,302,137 | 4/1994 | Suffi ........................................ 439/403 |
| 5,363,440 | 11/1994 | Daoud . |
| 5,779,504 | 7/1998 | Dominiak et al. ...................... 439/709 |

OTHER PUBLICATIONS

Technical Data Sheet of A. C. Egerton Limited, related to Mini Rocker Cross Connection Cabinets.

*Primary Examiner*—Michael L. Gellner
*Assistant Examiner*—Antoine Ngandjui

[57] ABSTRACT

A double sided insulation displacement type connector block contains oppositely facing, electrically connected arrays of insulation displacement connectors (IDCs) on both sides of the connector block. The connectors may be punch down or tool-less type IDCs. When tool-less IDCs are utilized, the double sided terminal block may also include double sided insulation displacement terminal strips with a reversible test feature.

6 Claims, 12 Drawing Sheets

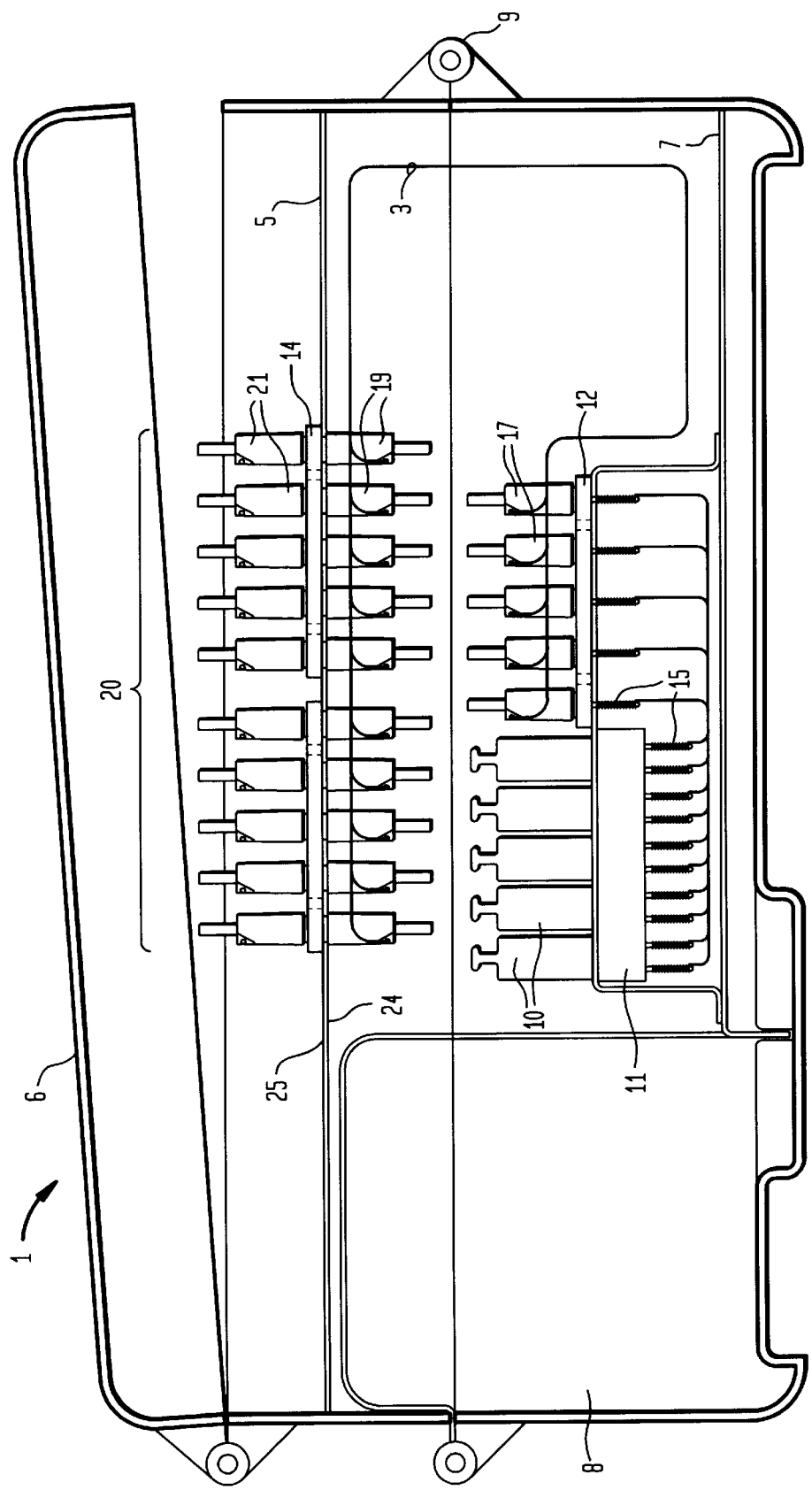

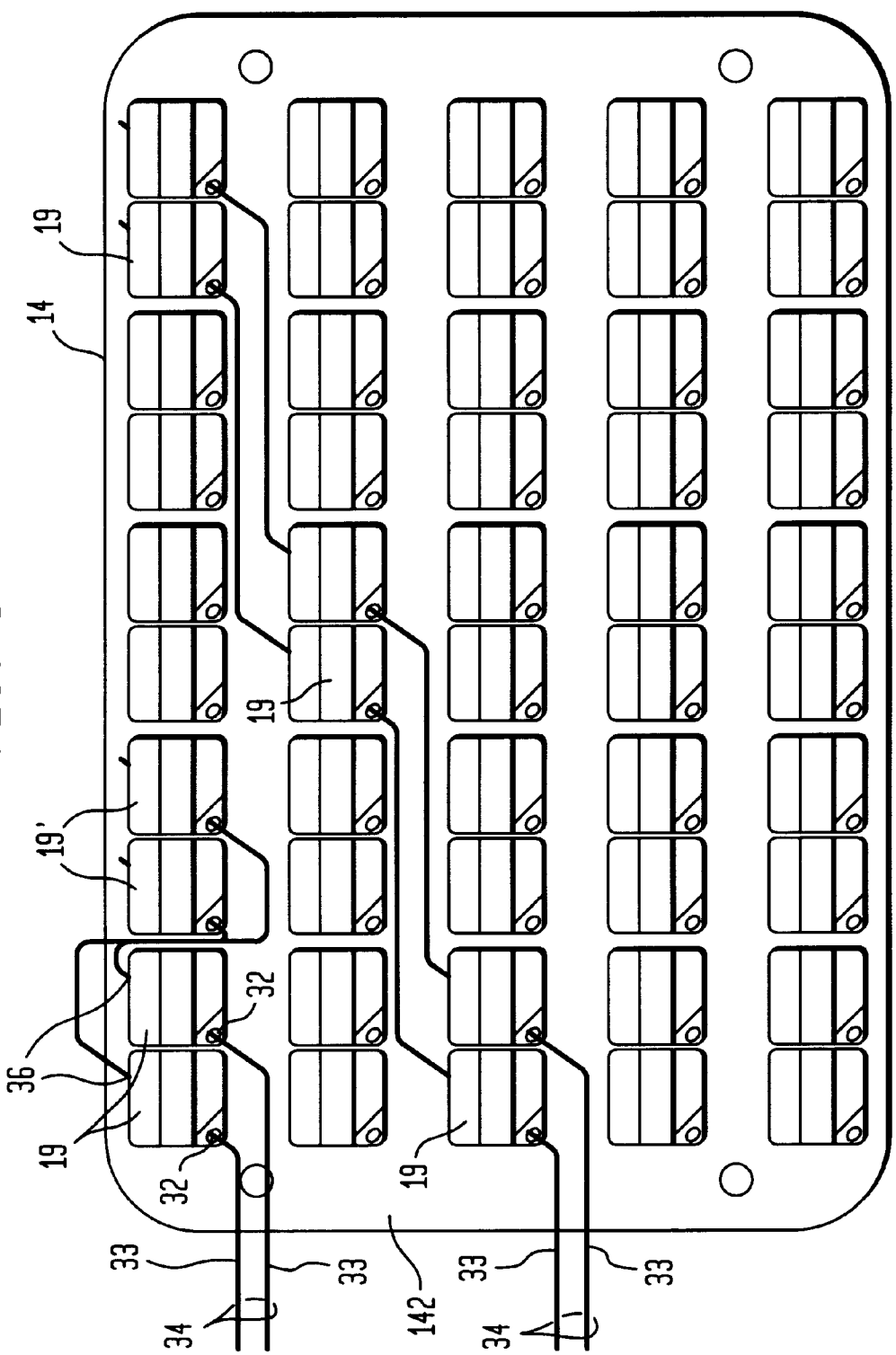

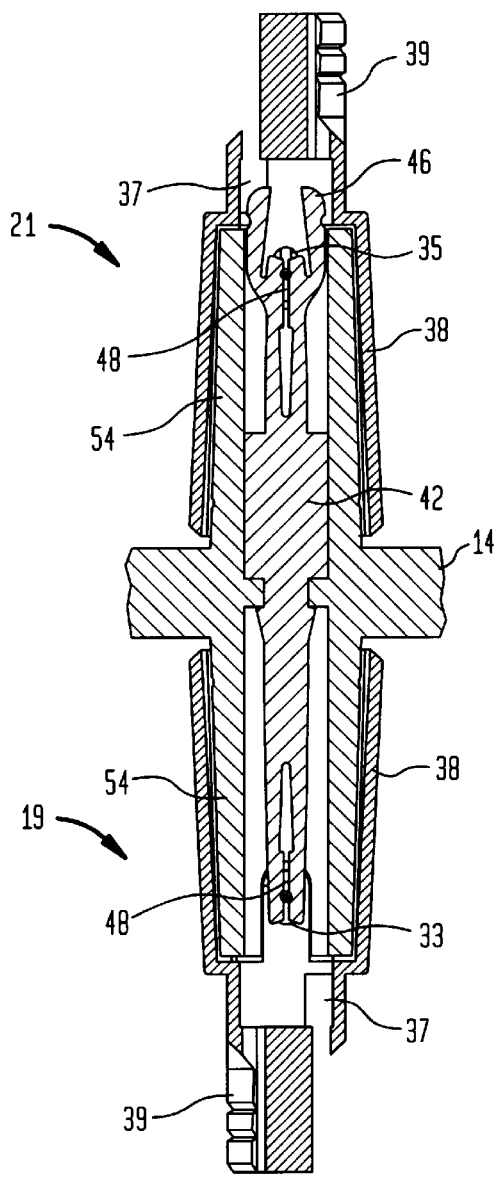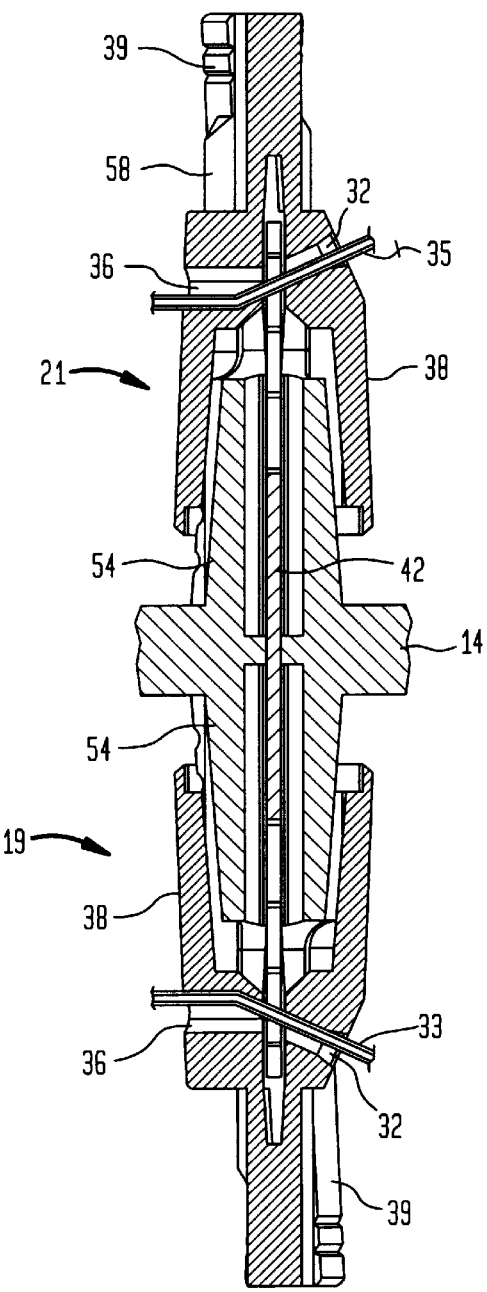

FIG. 14
FIG. 15
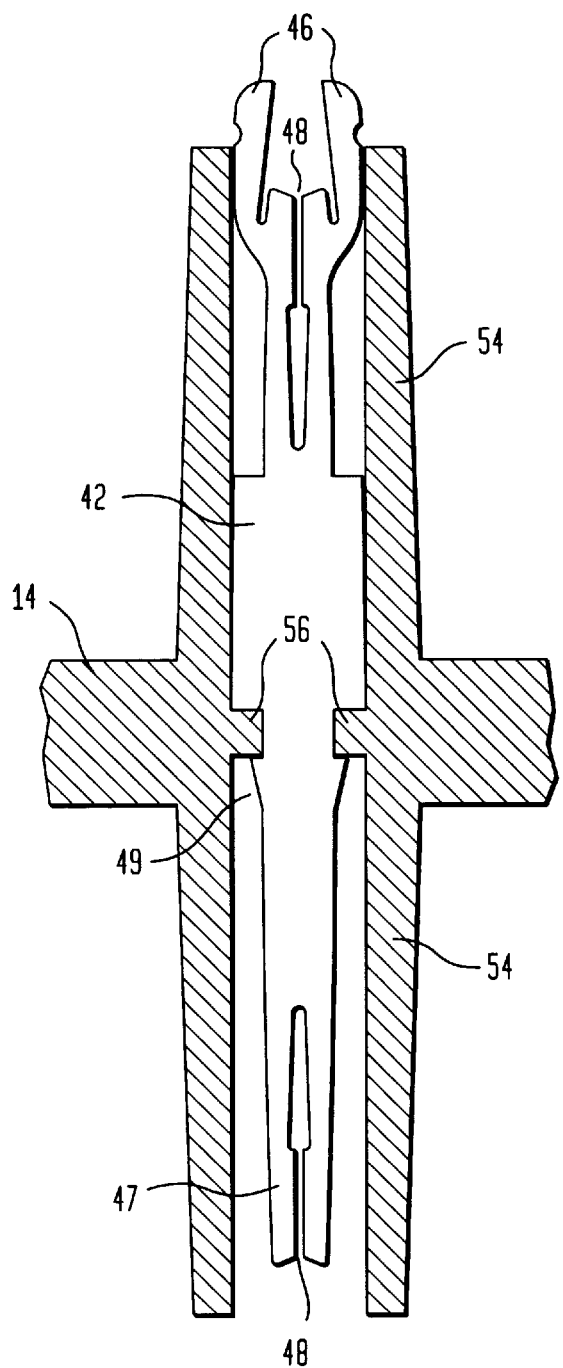
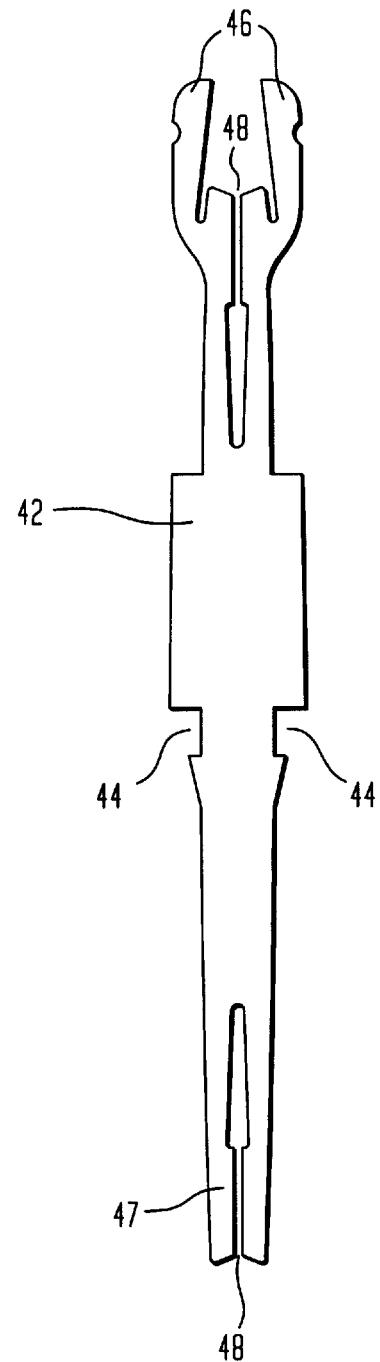

FIG. 18
FIG. 19
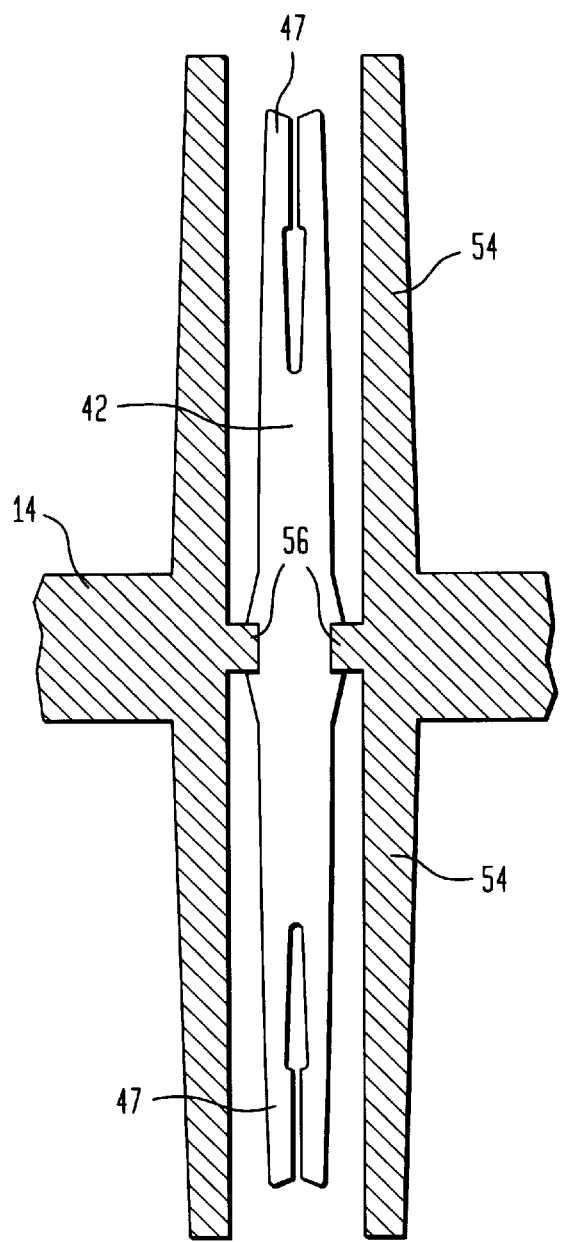
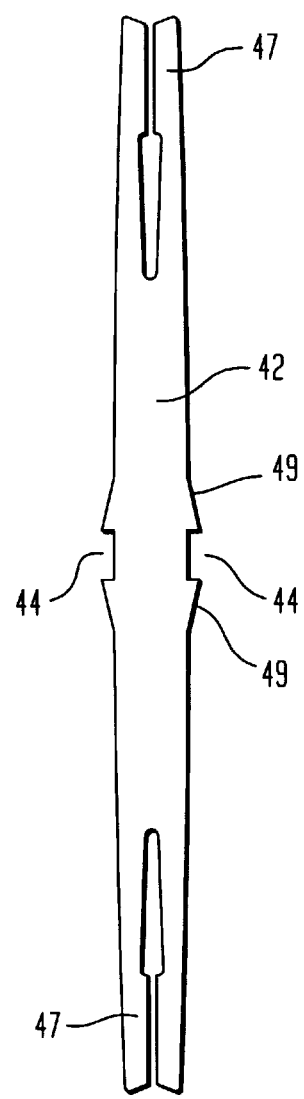

DUAL SIDED INSULATION DISPLACEMENT CONNECTOR BLOCK

FIELD OF THE INVENTION

This invention relates to the field of telephone wire connector blocks and distribution systems, and specifically for a dual sided insulation displacement connector block for use in, for example, distribution systems which permit the connection of a single telephone line tip ring wire pair to multiple tip ring wire pairs for the purpose of facilitating multiple connections to a single telephone line.

BACKGROUND OF INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs generally enter the building as part of a multi-conductor cable, the individual tip ring wire pairs must first be broken out from the cable into individual wire pairs. This is normally accomplished in a junction box known as, for example, a building entrance protector (BEP), or network interface unit (NIU). Within such devices the individual telephone line tip ring pairs are separated from the cable, individually connected to a connector block, and made available for further electrical connection and distribution. Usually there is a protector device inserted between the telephone and central office, or network side of the telephone line and the customer equipment or terminal side of the telephone line to protect the telephone and user, or other equipment connected to the telephone line, from hazardous overvoltages induced in the telephone network or in the cables passing between the telephone central office and the building within which the line is terminated.

In a typical arrangement, the telephone lines coming from the network are first wired to a protector field, which is an array of connectors for receiving the protector device, which is in turn hard wired to a first connector block which provides a first test point for testing the telephone line connections between the building and telephone central office. This first terminal block is hard wired to a multi pair connector, most typically a twenty-five pair connector of the RJ21 type, for further connection to an array of customer bridges which are also hard wired and connectorized via a mating RJ21 connector. The use of a customer bridge permits a subscriber to disconnect terminal equipment from a telephone line so that subscriber can isolate troubles on the line as originating in the telephone network, or on the terminal equipment side of the telephone line. An example of such an arrangement is shown in U.S. Pat. No. 5,363,440, dated Nov. 8, 1994, the disclosure of which is incorporated herein by reference. U.S. Pat. No. 5,363,440, depicts a multi-layered network interface unit which results in size economies due to the fact that the customer bridge connector block is hingeably connected to the telephone network protector array field so that rather than placing these two arrays side by side they can be mounted in overlying relationship, resulting in a saving of space.

Additionally, there are known insulation displacement connector (IDC) blocks for use in such junction boxes and/or distribution fields, such as the ubiquitous punch down connector block, also known as a 66-type connector block, and the tool-less insulation displacement connector blocks utilizing push cap connectors, such as that described in U.S. Pat. No. 4,913,659 dated Apr. 3, 1990, the entire disclosure of which is incorporated herein by reference. Such a connector block is commercially available under the product designation SC99 from Lucent Technologies Inc.

These known terminal blocks consist of an IDC type connector on one side of the connector block, and a matching, electrically connected wire wrap terminal on the other side, such that a wire connected on the wire wrap side may be connected to another wire on the IDC side of the block. Because wire wrap terminals are difficult to form connections on, and since once connected they are difficult and time consuming to re-wire, flexible, rapid connections and re-connections of wires on wire wrap terminals cannot be achieved. It is for this reason, among others, that the wire wrap side of such blocks are connectorized, frequently with RJ21 type connectors, and once wired not changed. This greatly diminishes the flexibility and ease of use of such connector blocks.

SUMMARY OF THE INVENTION

The present invention is directed at overcoming the shortcomings of the prior art. The invention comprises a dual sided insulation displacement connector block for flexible deployment in multi-layered wire distribution fields where multiple cross connections, bridge taps, or simply economies of speed of wiring, are required.

Positioned on the first side of the connector block is an array of terminal connectors capable of receiving individual wires which are generally part of individual tip ring wire pairs of telephone lines. Each of the terminal connectors in this array are electrically connected to a respective connector found in a similarly configured connector array on the opposite side of the connector block, thus creating an electrical connection between each terminal connector on one side of the block and a respective matching, corresponding connector on the opposite side of the connector block. The connectors on both sides of the block are insulation displacement type connectors (IDCs) having within each connector a double sided IDC terminal strip. While it is preferred to use tool-less IDC connectors, it is not necessary to do so, as punch down connectors may also be used.

As is presently known, tool-less IDC type connectors are configured with a feature that permits a test clip to be clamped onto the cap of the tool-less IDC connector. Because the cap is configured with one or more apertures which provide access to projections or ears on the terminal strip within the connector, an electrical test point is thus available for testing connections to the tool-less IDC connector without the necessity of removing the attached wire. While this is advantageous for test purposes, it is disadvantageous when the telephone line to which the connector is assigned must remain secure, such as, for example, in the case of an alarm line. In such instances, the ready access to the telephone line from outside the connector cap may provide an easy way for the alarm circuitry to be circumvented. Thus in the instances where a double sided tool-less IDC connector block is utilized, it is preferable to also utilize an IDC terminal strip which eliminates the test ears from one or both sides of the IDC terminal strip, and just such a terminal strip is described herein. In this way, there is no electrical connection point external to the IDC connector, providing for a more secure configuration as required.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 4 is an illustrative view of a dual sided connector of the present invention deployed in a multi-layered wiring enclosure, as seen through a bottom side thereof;

FIG. 5 is a plan view of one side of the connector block of FIG. 1 showing exemplary paths of individual conductors cross connected thereon;

FIG. 11 is a similar view to that of FIG. 10 with the respective caps of the double sided connector in a downward position showing a conductor stripped and retained therein;

FIG. 12 is a side sectional view taken along section A—A of FIG. 9 showing the double sided connector with the caps in the position depicted in FIG. 10;

FIG. 14 is a cutaway view of a double sided IDC connector showing a preferred metallic IDC terminal strip disposed therein;

FIG. 15 is a front view of the metallic terminal of FIG. 14;

FIG. 18 is a partial cutaway of a connector block showing inserted therein a further alternate double sided connector terminal;

FIG. 19 is a depiction of the alternate double sided connector terminal shown in FIG. 18.

DETAILED DESCRIPTION OF THE PREFERRED EMBODIMENTS

Figure 1:
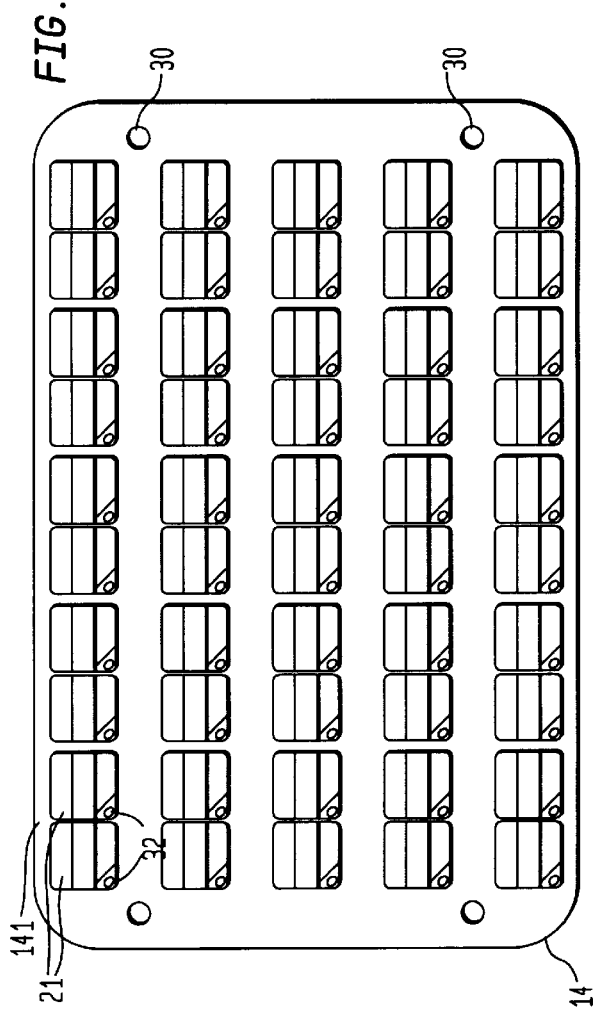
FIG. 1 is a top plan view of a dual sided tool-less insulation displacement connector block in accordance with the present invention.
Figure 3:
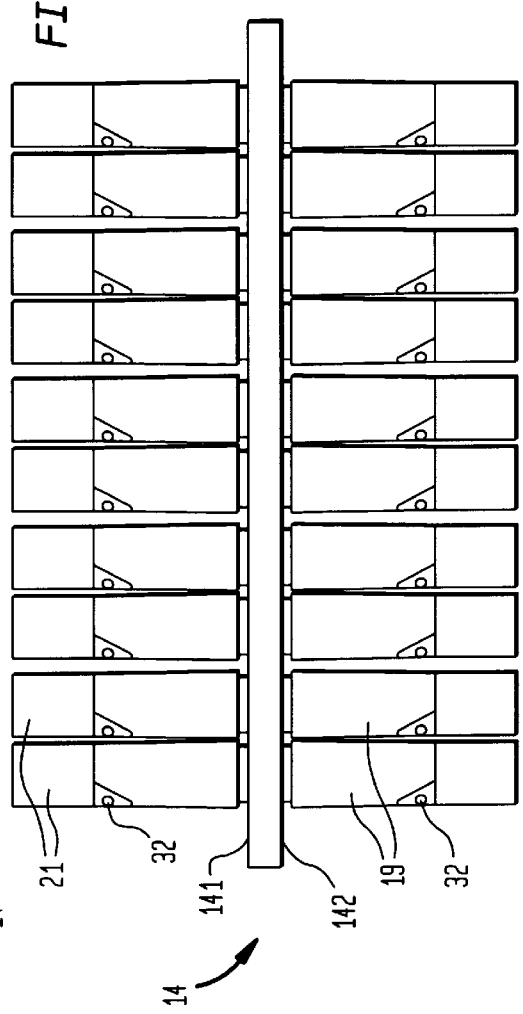
FIG. 3 is a bottom side view of the terminal block of FIG. 1.
Figure 2:
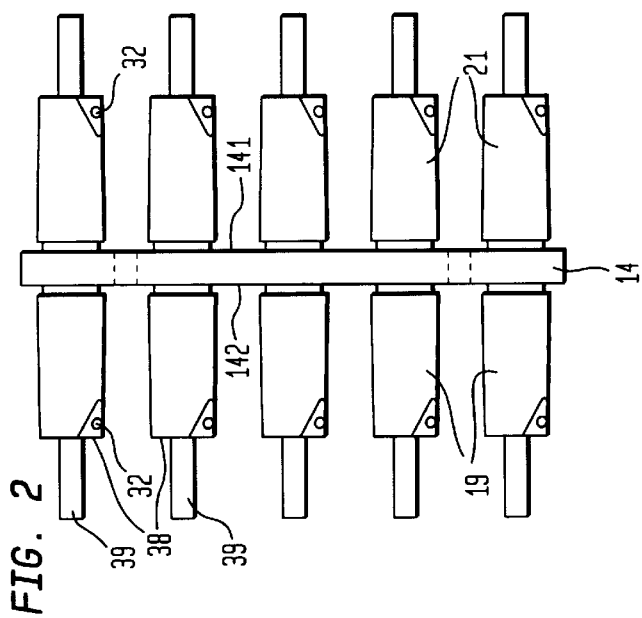
FIG. 2 is a left side view of the terminal block of FIG. 1.

With reference to FIGS. 1 through 3, a double sided or dual sided IDC connector block 14 of the present invention contains an array of connectors 21 on one side 141 of the connector block and a respective matching array of IDC connectors 19 on the opposite side 142 thereof. Each connector 19 is electrically connected to its matching opposite connector 21 on the opposite side of connector block 14 via an internal metallic IDC terminal strip (terminal 42, FIG. 6) discussed further below. Thus, an electrical conductor inserted into wire insertion hole 32 of connector 19 will be electrically connected to its matching connector 21 on the opposite side of block 14 and available for connection through a wire insertion hole 32 on connector 21.

IDC connectors 19 and 21 comprise a cap 38 through which an electrical conductor may be inserted through insertion hole 32. At the top of each cap 38 is a cap grip 39 which facilitates gripping by an installer or other user for moving the cap between its two available positions for insertion and stripping and connection of an electrical conductor, in a manner known in the art. Connector block 14 is also typically provided with mounting holes 30 to facilitate mounting of the block 14 to the inner surface of enclosure 1 via screwing or riveting. It will, of course, be recognized that the precise method of securing block 14 to an enclosure or other surface is a matter of design choice within the skill of the routineer in the art, and may be achieved via screwing, riveting, adhesion, snap fitting, or any other recognized method of achieving a firm mechanical connection between the block and the structure to which it will be mounted.

For example, and with reference to FIG. 4, double sided connector block 14 may be deployed in a multi-layer wiring distribution enclosure 1, such as, by way of non-limiting example, a building entrance protector (BEP) and cross connect field or a network interface unit (NIU) and cross connect field. The enclosure has a bottom layer 7 generally forming the bottom half of the enclosure and a top layer 5 generally forming the top half of the enclosure. Optionally, an outer cover 6 may be provided for further sealing the enclosure. The enclosure 1 consists of a splice chamber 8 of a type known in the art, for receiving a feeder cable 2 consisting of multiple pairs of electrical conductors, each pair representing the tip and ring leads of a telephone line coming from a telephone central office or other telephone network facility. It is also possible for the invention to be utilized in private branch exchange (PBX) or Centrex environments, with the lines being PBX lines or Centrex lines rather than network lines. Indeed the skilled practitioner will recognize, from the teachings herein, the applicability of the present invention to myriad telephone distribution applications. The enclosure may be fabricated of metal, plastic, synthetic resin or any combination thereof, or any other material suitable to the application in which the invention will be deployed, as a matter of design choice.

The individual tip ring wire pairs from feeder cable 2 (not shown) are connected through input connectors or through direct wire terminations, in a manner known in the art, to a protector field 11 containing, for each tip ring wire pair, a protector device 10 for providing overvoltage protection on the telephone line. The protector field 11 is hard wired to a feeder field connector block 12 through fixed wire connections, typically effected through wire wrap terminals 15, to a first connector array which consists of a plurality of connectors 17 arranged in pairs in the array, each connector pair terminating a particular tip ring wire pair of a particular telephone line coming from the telephone network. While in a conventional multi-layered box the feeder field would also be connectorized and each tip ring pair associated with a dedicated terminal pair in a further connector block, a feeder field connector block 12 when utilized in conjunction with the present invention need not be connectorized, so as to permit individual wire conductors to be passed from the connectors 17 of the first connector array to a subsequent second array of connectors 19, described further hereinbelow.

With continued reference to FIG. 4, the top layer 5 of enclosure 1 is hingeably connected to bottom layer 7 via a hinge 9. Hinge 9 may be any pivotable connection permitting relative angular movement between layers 5 and 7, such as, for example multiple individual hinges, a piano hinge, a living hinge, or other art recognized pivotable connection. FIG. 4 depicts the folded, or closed position of top layer 5, wherein a first side 24 of top layer 5 overlies the bottom layer 7. The second side 25 of top layer 5 faces outwards and away from bottom layer 7. A securement device (not shown) such as a lock, latch, screw, magnetic closure or other means may be optionally provided to maintain the enclosure in the folded, closed position.

Connections between the first array to the second array are made by connecting individual electrical conductors from connector 17 of the first array to connector 19 of the second array which is positioned on one side of the double sided connector block 14 of the present invention. Groups of conductors 3, which may be bundled together or not, as a matter of choice for the workmen skilled in the art, traverse hinge 9.

A third connector array 20 is made up of connectors 21, which are also part of the double sided connector block 14 which comprises, as discussed above and as depicted in FIGS. 2 and 3, connectors 19 on one side 142 of the block 14, and connectors 21 on the opposite side 141 of the block 14. Each connector 19 is electrically connected via a metallic contact or terminal strip with the associated respective matching connector 21 oriented on the opposite side of block 14. Thus, in the exemplary enclosure shown, an electrical conductor connecting a respective connector 17 and a selected connector 19 would in effect connect connector 17 to the matching connector 21 on the opposite side of selected connector 19. Connector block 14 would preferably be mounted on the second, outwardly facing side 25 of top layer 5 of enclosure 1.

Referring to FIG. 5, there is shown one side 142 of the double sided IDC connector block 14. Telephone wire pair 34, made up of individual conductors 33, may, for example, be fed from a dedicated telephone line pair on connector block 12 (FIG. 4). The individual conductors 33 of tip ring pair 34 may be readily connected to one or multiple connectors 19 to facilitate the appearance of telephone line pair 34 on multiple pairs of connectors on block 14. Specifically, and with additional reference to FIGS. 6 through 8, an individual conductor 33 may be fed through an insertion hole 32 in a cap 38 of tool-less IDC connector 19. Rather than inserting the conductor 33 just far enough into cap 38 to facilitate connection, the conductor may be fed completely through insertion hole 32 and out through exit hole 36 for further connection to another connector 19', so as to facilitate the connection of multiple connectors to the single electrical conductor 33. As seen in FIG. 5, by threading a single conductors 33 into and out of multiple connectors 19, numerous connections or "taps" may be made to a single telephone line terminated on connector block 14.

Figure 6:
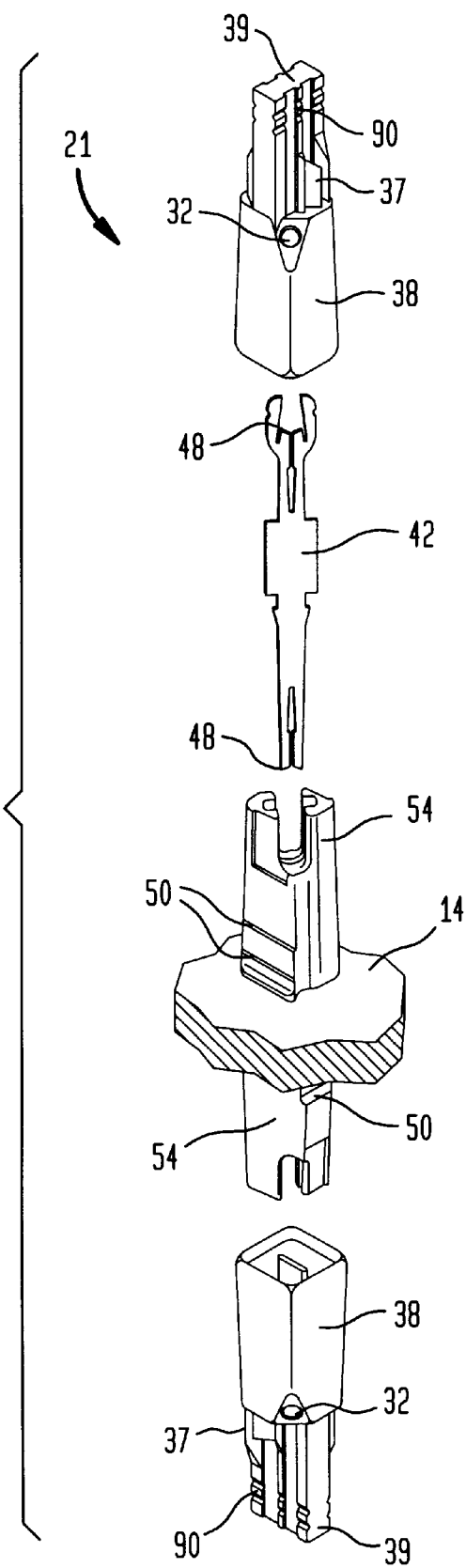
FIG. 6 is an exploded perspective view of one tool-less, double sided connector forming a part of the connector block of FIG. 1.
Figure 7:
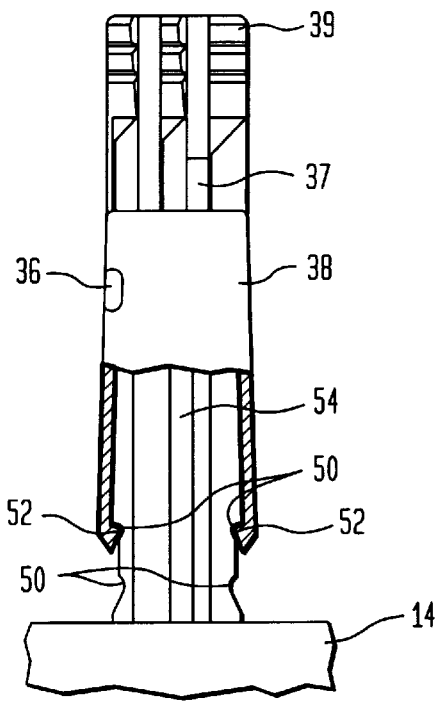
FIG. 7 is a partial cutaway view of a single side of the double sided connector of FIG. 1 with the cap placed in a position of readiness to receive an individual conductor.
Figure 8:
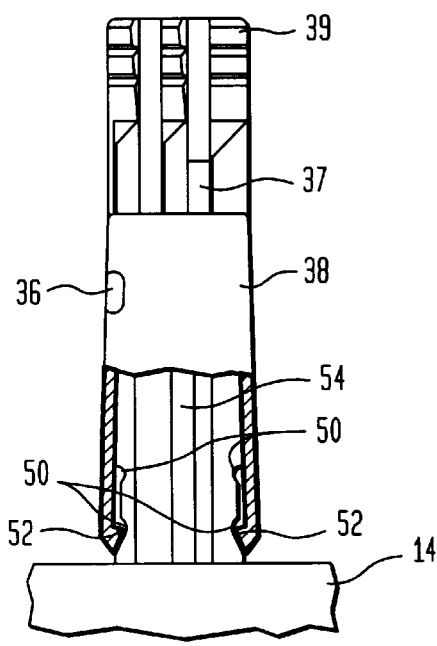
FIG. 8 is a partial cutaway view of the connector of FIG. 7 with the cap pushed downward into a position which would retain, and displace the insulation of, an individual conductor.

In further detail, and with reference to FIGS. 6 through 8, each IDC connector on double sided connector block 14, regardless of on which side of block 14 the connector is positioned, comprises a terminal housing base portion 54 upon which moveable cap 38 is positioned. Cap 38 is movable from a first upper position, wherein protrusions 52 mate with an upper set of detents 50 on housing 54. In this first position a wire may be inserted through entrance hole 32 and fed out through exit hole 36 without the electrical conductor within the wire making contact with the metallic terminal strip 42 within the connector 19. After the wire is positioned in a desired fashion through cap 38, the cap is pushed down by pressing on cap grip portion 39, which causes the wire to encounter the wire retention region 48 of metallic terminal 42, which strips the insulation from and grips the metallic conductor within the wire, in a manner known in the art.

To facilitate testing of connections made through the connector, a test aperture 37 is provided in an upper portion of cap 38 to permit access to the ends of metallic terminal 42 for the application of test leads, thereby facilitating an electrical connection to the terminal 42, and therefore the connected conductor, without the need to disconnect the conductor or cap from the connector to perform testing.

As seen in FIG. 6, cap grip portion 39 contains textured features 90 to facilitate gripping by an installer or other user of the invention, simplifying the movement of cap 38 between its upper open position, where it is ready to receive a wire conductor, and its lower closed position whereby the wire conductor is stripped and gripped by the terminal within the connector.

Figure 9:
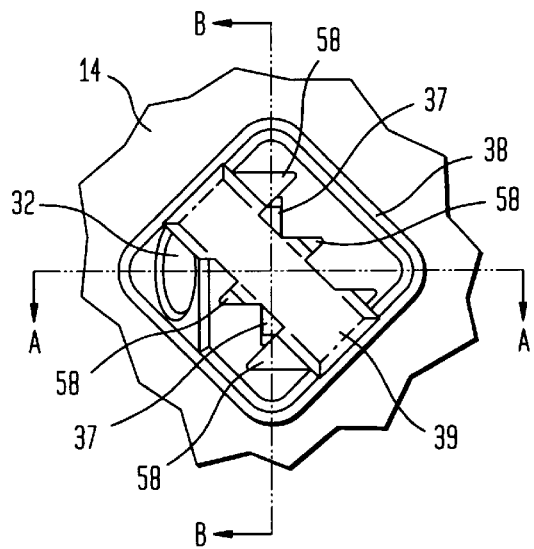
FIG. 9 is a top view of an individual connector of the connector block of FIG. 1.

Referring to FIG. 9, there is shown a top view of a portion of one side of a connector block 14 depicting additional features in the cap grip 39. Specifically, the test apertures 37 are positioned so as to be recessed within cap grip protrusions 58 so that upon gripping a cap after insertion of a metallic conductor, the user's fingers are kept away from an exposed portion of the metallic terminal 42 within the connector cap, to prevent contact with a live conductor.

Figure 10:
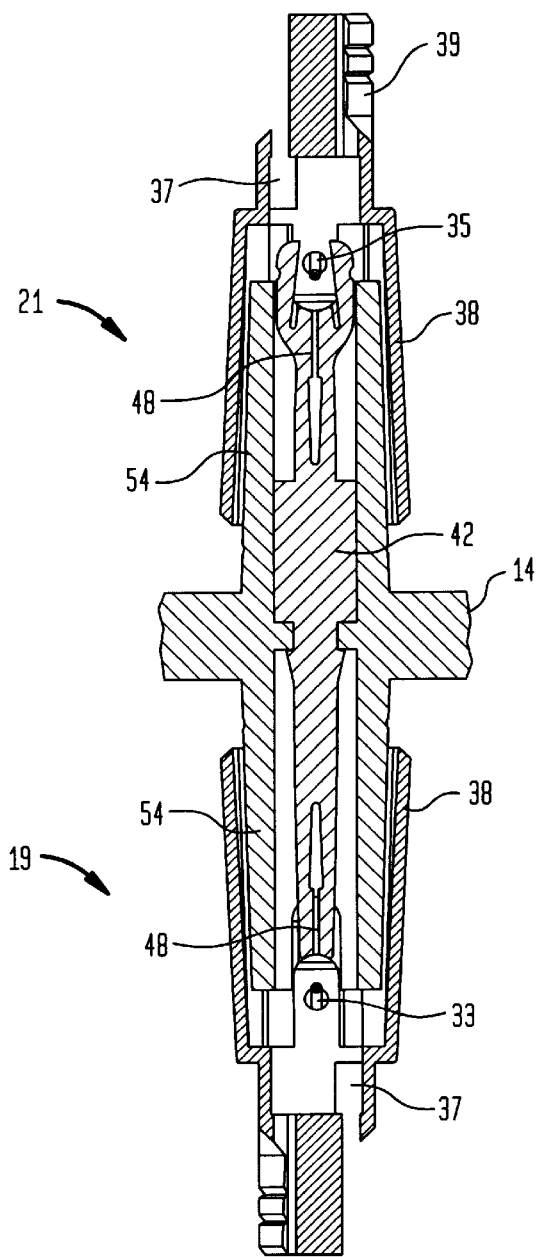
FIG. 10 is a side sectional view taken along section B—B of FIG. 9 with the respective caps of both sides of the double sided connector in a position of readiness to receive an individual conductor.
Figure 13:
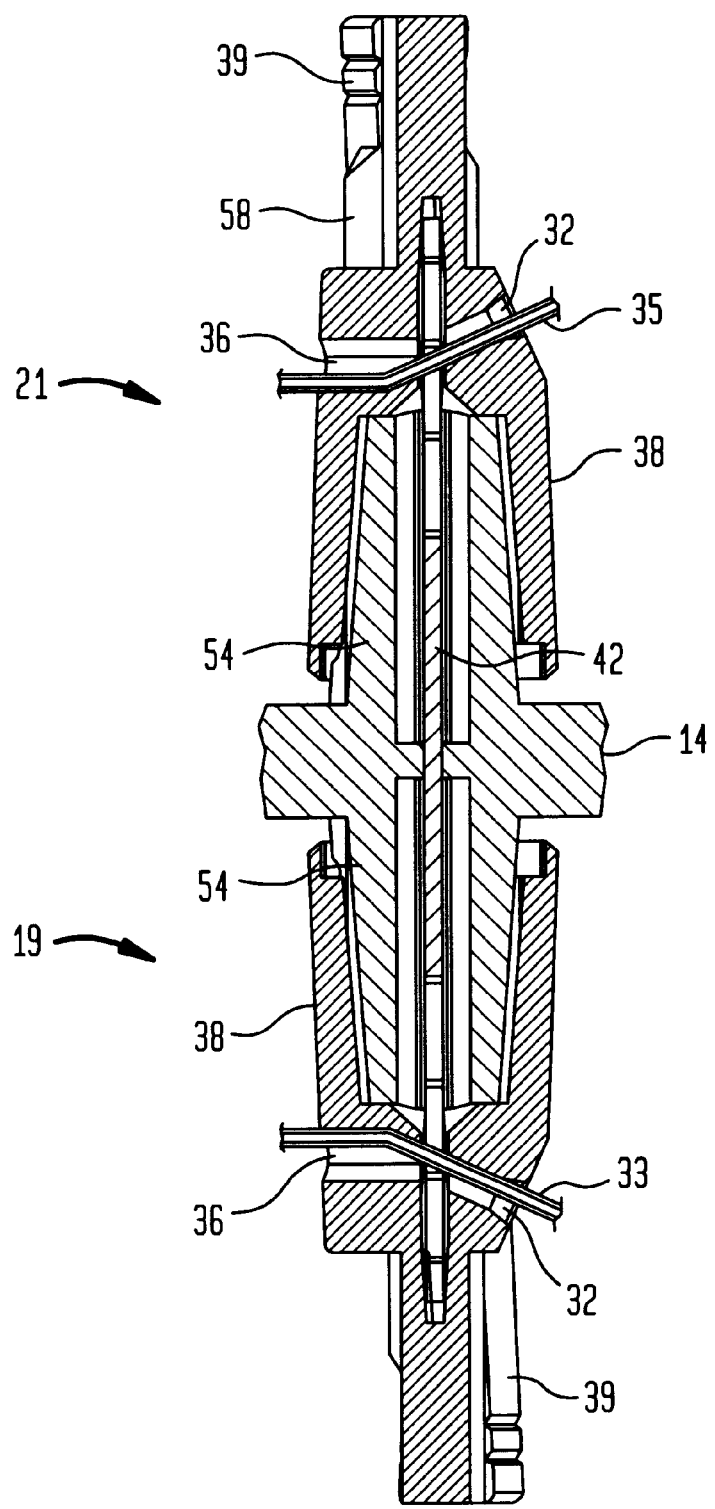
FIG. 13 is a side sectional view taken through section A—A of FIG. 9 showing the respective caps of the double sided connector in the position shown in FIG. 11.

Referring to FIGS. 10 and 11, there is depicted a sectional view of the double sided tool-less IDC connector depicted in FIG. 10, taken along section B—B. FIGS. 12 and 13 are similar sections taken along section A—A of FIG. 9. Referring to FIGS. 10 and 12, the upper connector 21 is shown with its cap 38 raised in its upper, open position, permitting insertion through insertion hole 32 of a single conductor 35 which may be passed through wire exit hole 36. Similarly, the lower portion of FIGS. 10 and 12 depict terminal 19 with cap 38 in the raised position with a conductor 33 inserted therein. In the raised position, no portion of terminal strip 42 protrudes through aperture 37.

With reference to FIGS. 11 and 13, the respective cross sections are shown with cap 38 pushed down upon housing portion 54 whereupon, with respect to connector 21, conductor 35 is pushed into wire gripping region 48 of terminal strip 42 in a manner known in the art. Likewise, wire 33 is driven into wire gripping region 48 of connector 19, thereby forming an electrical connection between conductor 33, inserted in connector 19, and conductor 35, inserted in connector 21, through metallic terminal 42. With reference to connector 21, at an end region of metallic terminal 42 there are formed test ears 46, which are exposed through test apertures 37 when cap 38 is pushed down into its closed position upon housing portion 54.

Referring now to FIGS. 6, 14 and 15, the metallic terminal strip 42 is shown in greater detail. As seen in FIGS. 6 and 14, metallic terminal 42 is insertable into the block 14 so as to extend through both respective housing portions 54 on both sides of block 14 and form an electrical connection between the connector on one side of block 14 and its respective matching opposite connector on the other side of the block 14. Terminal strip 42 is provided with a sloped region 49 which, upon insertion downward into upwardly facing housing portion 54 of connector block 14, extends between snap fit protrusions 56 so as to facilitate securement of terminal 42 within connector block 14 through the mating engagement of snap fit protrusion 56 and snap fit recesses 44 of terminal 42. As mentioned above, test ears 46 are provided on one end of terminal strip 42 extending beyond wire grip region 48 to permit electrical access to metallic terminal 42 through test aperture 37 in cap 38. Test ears 46 would normally be oriented so as to be available in the third array of enclosure 1 (FIG. 4), for example, thereby permitting an installer, repair person or other user requiring testing ability to perform electrical tests on specific telephone lines without the need to unfold enclosure 1. This greatly simplifies testing, and assists in the localization of problems, should they occur. The opposite end 47 of terminal strip 42 contains no test ears. Thus there is no access to the portion of terminal 42 extending through the opposite housing unit 54 through cap 38. However, because there may be occasion to selectively isolate the terminal 42 from access through cap 38, such as, by way of non-limiting example, for security lines and alarm lines, terminal strip 42 may be removed from block 14 by pulling on test ears 46 or other part of terminal 42 with fingers or pliers or other suitable tool, causing snap fit protrusions 56 to release from snap fit recesses 44 and effecting removal of terminal strip 42 from connector block 14. The terminal strip 42 may then be reinserted from the opposite side of the base 14 so that the earless side 47 will be facing upwardly, so as to deny access to terminal strip 42 through cap 38 without unfolding the entire enclosure 1. Thus, the double sided connector 14 may include a flexible test feature whereby the ability to gain electrical access to terminal strip 42 may be selectively altered from one side of block 14 to the other.

Figure 16:
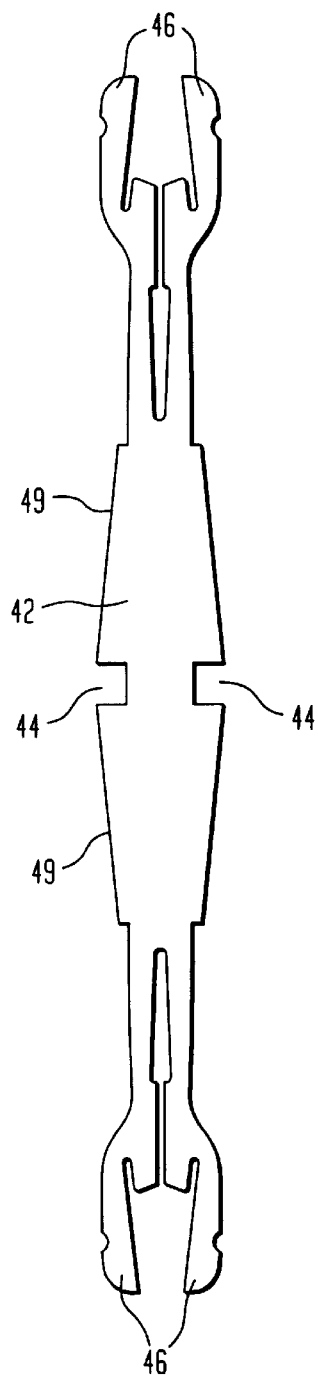
FIG. 16 is an alternate embodiment of an IDC connector terminal strip for use in a double sided IDC connector block.
Figure 17:
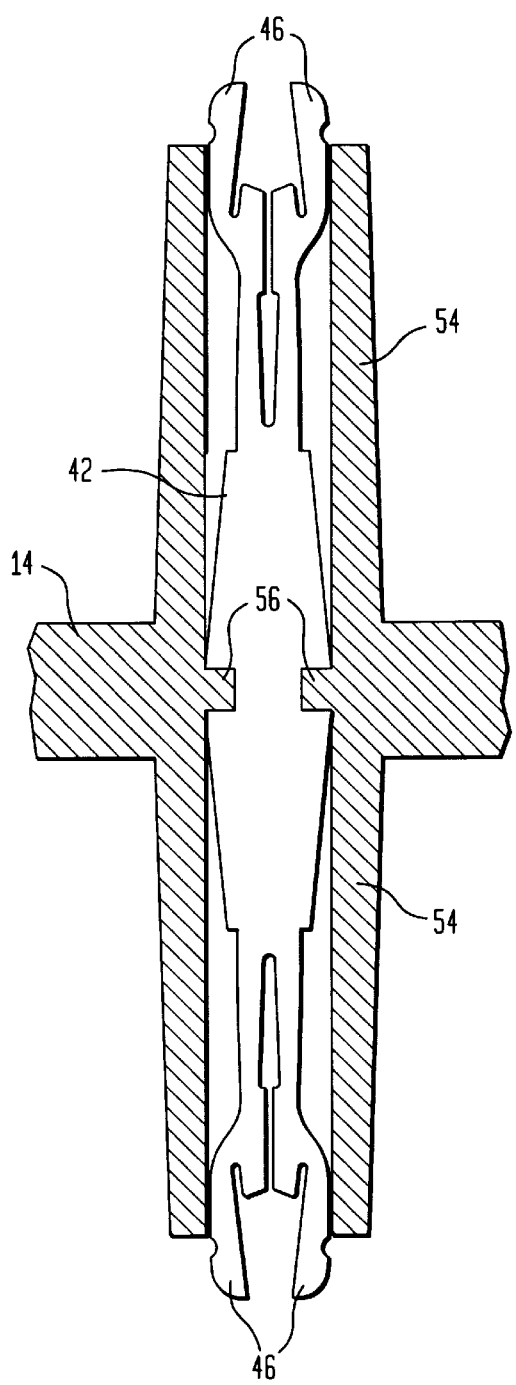
FIG. 17 is a partial cutaway showing the double sided terminal strip of FIG. 16 inserted within a connector block.

There may be, however, occasions when tests ears 46 need to be accessed from both sides of connector block 14. In such instances, and with reference to FIGS. 16 and 17, the terminal strip 42 may be configured to have sloped regions 49 on both sides of snap fit recesses 44 for selective insertion through either side of connector block 14 through respective housing portions 54. Terminal 42 may then be equipped with test ears 46 on both sides, thereby permitting electrical access to terminal 42 from either side of connector block 14 through test apertures 37 in respective caps 38 on both sides of block 14.

Alternatively, there may be occasions when no test access is required or desired, whereby the configuration depicted in FIGS. 18 and 19 may be utilized. In such an instance, neither side of the IDC terminal strip 42 contains test ears 46, both ends 47 being shortened so as to not protrude through test apertures 37 in caps 38 after installation and insertion of respective electrical conductors. With this terminal strip, apertures 37 can be eliminated if so desired. Insertion and removal of the terminal strip, and snap fit retention via protrusions 56 and recesses 44, is accomplished as described above in connection with the preceding terminal strip embodiments. Thus, the double sided connector block of the present invention may be provided with a variety of terminal strip options further increasing the flexibility of application and utilization of the present invention by the person of skill the art.

Figure 20:
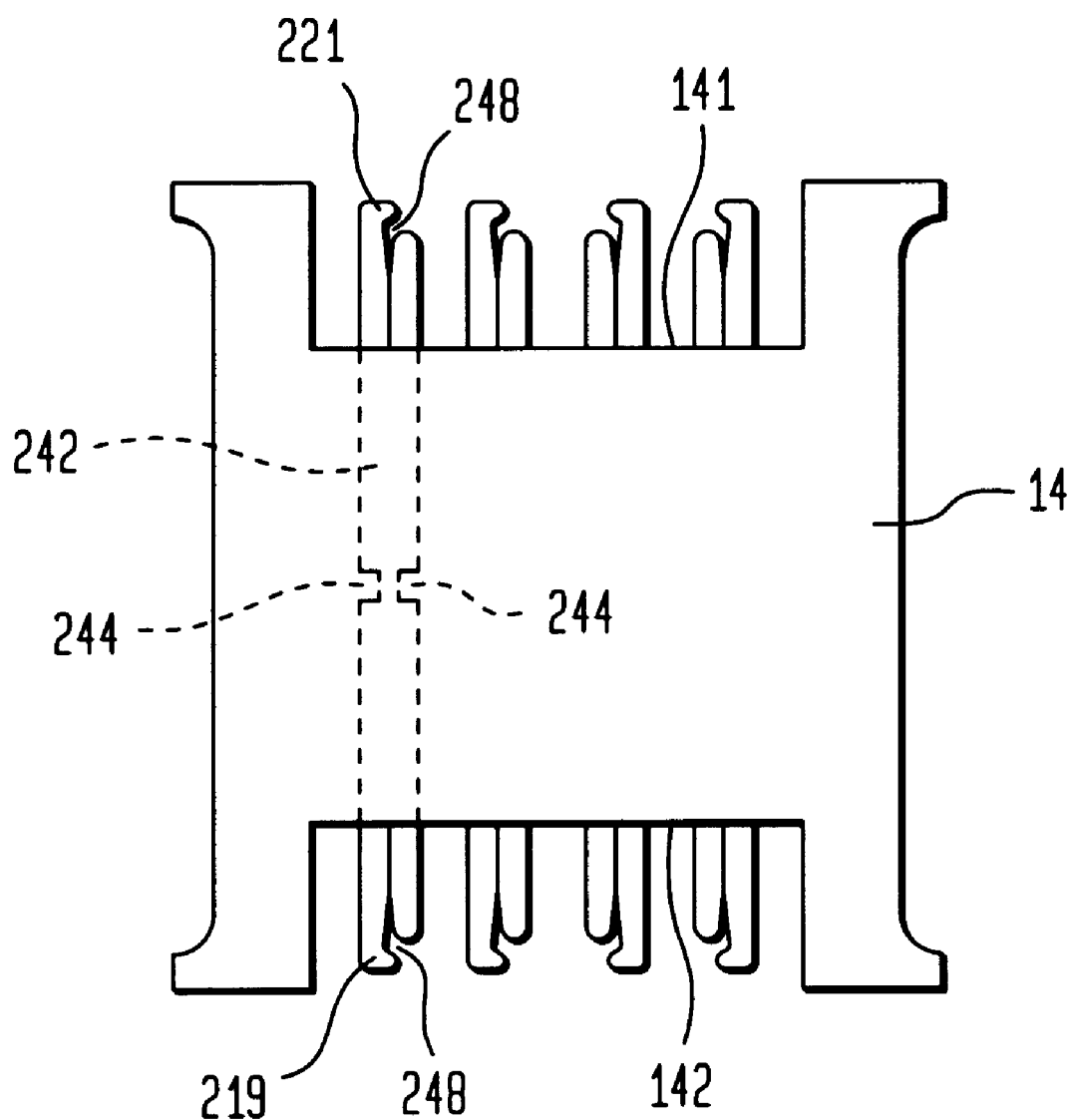
FIG. 20 is a depiction of an alternate embodiment of the connector block of the present invention.

Although preferably the dual sided connector block of the present invention utilizes tool-less IDC type connectors, it is also contemplated that punch down type IDC connectors be utilized, as shown in FIG. 20. Specifically, block 14 may be configured with IDC connectors 221 on one side 141 that are electrically connected to matching IDC connectors 219 on opposite side 142 of block 14 via terminal strip 242. A conductor (not shown), is inserted into wire retention region 248 of respective connectors 221 and 219 using a punch down tool (not shown), in a manner known in the art, to effect stripping of the insulation from the conductor and retention within the wire retention region 248. Terminal strip 242 is retained within block 14 via snap fit detents 244, or by any other art recognized manner, as set forth above.

In all embodiments, terminal strip 42, 242 may be formed of any commonly known conductive metal known in the art and suitable for use in such terminals, such as, for example, platinum washed phosphor bronze, or beryllium-copper alloy or other metal or alloy combining good electrical conductivity with sufficient mechanical strength and resilience. Similarly, connector block 14 is preferably formed of a molded synthetic resinous material with good insulating properties and mechanical strength, as are caps 38. The specific materials utilized in constructing connector block 14 and caps 38 are an application specific matter of design choice within the knowledge of the person of skill familiar with terminal blocks utilized in the telephony art. Moreover, the specific means of affixing terminal 42 within block 14 need not be solely by snap fitting as described above, but by numerous methods of affixation known in the art, such as adhesives, friction fitting, integral molding, and the like, depending on whether ready removal and re-insertion of the terminal is required, as a matter of application specific design choice.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A dual sided connector block, comprising:
a flat base having a first side and a second side opposite the first side;
a first array of insulation displacement connectors on said first side;
a second array of insulation displacement connectors on said second side; and
an electrical connection connecting each connector of said first array to a respective single matching connector of said second array;
said electrical connection between said matching first array connectors and said second array connectors being formed via an electrically conductive terminal strip having at opposite ends thereof a wire retention region for stripping insulation from and retaining therein an electrical conductor, such that a conductor retained in said retention region at one end of said terminal strip is electromechanically connected to a conductor retained in said retention region at the opposite end of said terminal strip;
said connectors of said first and said second arrays further comprising:
a terminal housing portion upstanding from said base for retaining therein a portion of said terminal strip;
a cap having therein an entrance aperture and an exit aperture for passage therethrough of an electrical conductor, said cap being slideably matingly engageable with said housing portion and slideably moveable between a first position for facilitating insertion of a conductor into said cap through said entrance aperture and a second position wherein said inserted conductor is forced by said cap into contact with, and stripped and retained by, said wire retention region of said terminal strip; and said terminal strip further comprising at least one test ear extending beyond one respective wire retention region, and wherein said cap comprises a test aperture so sized and oriented that when said cap is in said second position at least a portion of said test ear protrudes through said test aperture for electrical access to said terminal strip from outside said cap.

2. The connector block of claim 1, wherein said terminal strip is removeably mounted in said connector block such that said test ear may be selectively oriented to be accessible through a selected one respective cap on a selected one of said opposite sides of said connector block.

3. The connector block of claim 1, further comprising means for mounting said connector block to a surface.

4. The connector block of claim 1, wherein said terminal strip comprises at least one test ear at both ends of said terminal strip.

5. The connector block of claim 4, further comprising cap protrusions formed on a portion of said cap adjacent said test aperture, such that when said cap is gripped by a user the user's fingers are prevented from contacting the portion of said test ear protruding through said test aperture.

6. A method of manufacturing a double sided insulation displacement connector block, comprising the steps of:

forming, from an electrical insulating material, a base having a first side and a second side;

forming in said base a terminal housing portion; and inserting in said terminal housing portion an electrically conductive double sided insulation displacement connector terminal strip having formed thereon, at opposite ends thereof, wire retention regions for stripping insulation from and retaining therein an electrical conductor, such that a conductor retained in said retention region at one end of said terminal strip is electromechanically connected to a conductor retained in said retention region at the opposite end of said terminal strip, said terminal strip further comprising at least one test ear extending beyond one respective wire retention region.

\* \* \* \* \*